RECORDER APPARATUS

Original Filed May 5, 1964

INVENTORS:
R. T. Hood, Jr.
George A. Ruger
Thomas M. Messick
By Keith D. Beecher
Attorney

RECORDER APPARATUS

Original Filed May 5, 1964

INVENTORS:
R. T. Hood, Jr.
George A. Ruger
Thomas M. Messick

By Keith D. Beecher
Attorney

INVENTORS
R. T. Hood, Jr.
George A. Ruger
Thomas M. Messick
By Keith D. Beecher
Attorney INVENTORS:
R. T. Hood, Jr.
George A. Ruger
Thomas M. Messick
By Keith D. Beecher
Attorney INVENTORS:
R. T. Hood, Jr.
George A. Ruger
Thomas M. Messick
By Keith D. Beecher
Attorney

United States Patent Office 3,437,280
Patented Apr. 8, 1969

3,437,280
RECORDER APPARATUS

R. T. Hood, Jr., Torrance, George A. Ruger, Manhattan Beach, and Thomas M. Messick, Lakewood, Calif., assignors, by mesne assignments, to Lockheed Aircraft Corporation, Plainfield, N.J., a corporation of California Continuation of application Ser. No. 365,018, May 5, 1964. This application Oct. 26, 1966, Ser. No. 589,760
Int. Cl. G11b *15/32*
U.S. Cl. 242—55.13 6 Claims

ABSTRACT OF THE DISCLOSURE

A portable recorder with a removable tape cartridge having openings formed in the cartridge to expose the tape to the recording transducer head and capstan drive units. Take-up and storage reels in the tape cartridge are intercoupled to maintain tape tension by mechanisms which include a pair of floating tape reel engaging wheels carried inside the cartridge for rotation about axes fixed relative to each other. The wheels are spring biased into engagement with the tape reels and coupled by toothed pulleys and a ribbed belt to provide a fixed ratio between wheel peripheral speeds for tensioning the tape.

This application is a continuation of Ser. No. 365,018 filed May 5, 1964 and now abandoned.

The present invention relates to improved apparatus of the magnetic tape recording type, and it relates more particularly to improved portable magnetic tape recording apparatus which is particularly constructed to receive and record binary coded digital data, analog information, and the like.

The apparatus of this invention is of the same general type as the apparatus disclosed and claimed in copending application Ser. No. 253,955, filed Jan. 25, 1963, which has now issued as Patent No. 3,195,139.

As pointed out in the aforementioned copending application, it is usual for the different types of domestic utility meters, which measure the consumption of water, gas and electricity, to include internal decade registers and associated dials and indicators. These dials and indicators furnish readings of the accumulated consumption of the particular commodity in decimal integers, and usually in units, tens, hundreds, and thousands respectively.

The usual practice today is for the utility company employees periodically to read the various utility meters, and to enter the reading in record books which are carried by the employees. The readings in the record books are later transposed at the central station into a suitable input for the electronic automatic data processing and billing machine located at that station.

The present day prevalent practice of the utility companies, as outlined in the preceding paragraph, is inefficient and subject to error.

It has been proposed in the past that suitable digital encoders be incorporated into the utility meters, so that the meter readings thereof may be converted into binary coded digital outputs. Such an encoder is described and claimed, for example, in copending application Ser. No. 254,126, filed Jan. 28, 1963, now abandoned.

The aforesaid binary coded outputs are then recorded by the metermen in appropriate recording apparatus. The recording apparatus of the present invention is particularly adapted to be used in conjunction with such encoders, so as to provide a recording of the various utility meter readings.

It is, accordingly, an object of the present invention to provide an improved magnetic tape recording apparatus which is reliable, easy to operate, light in weight, small in size, and which is particularly adapted for use in conjunction with utility meters, for manually reading such meters, or for automatically reading the meters when they are equipped with suitable digital encoders.

A feature of the invention is the provision of such improved magnetic tape recording apparatus in which the recording tape is housed in a removable cartridge which incorporates simplified means for driving the tape when the cartridge is in place.

A further feature of the invention is the provision of such apparatus in which the only connection between the cartridge and the other components of the recording apparatus is a capstan drive shaft; and which cartridge is constructed to exert a constant tension on the tape drawn by the capstan regardless of the amount of tape on each reel.

A further feature of the present invention is the provision in the recording apparatus of a paper tape mechanism viewable through a window in the housing of the recorder.

The aforesaid paper tape mechanism is available to provide route information for the meterman. The paper tape mechanism is also housed in a removable cartridge and it is mechanically linked to the magnetic tape mechanism in the recorder, so that it automatically advances the paper tape to the next address on the route at the completion of each recording cycle. Each recording cycle corresponds, for example, to a reading of a particular meter at a particular address.

Yet another feature of the recording apparatus of the invention is the provision of means for recording the utility meter readings in the recording apparatus, by manually-operated switches, when the readings, for one reason or another, have not been encoded.

Other objects, advantages and features of the invention will become apparent from a consideration of the following specification, when the specification is taken in conjunction with the accompanying drawings, in which.

Figure 1:
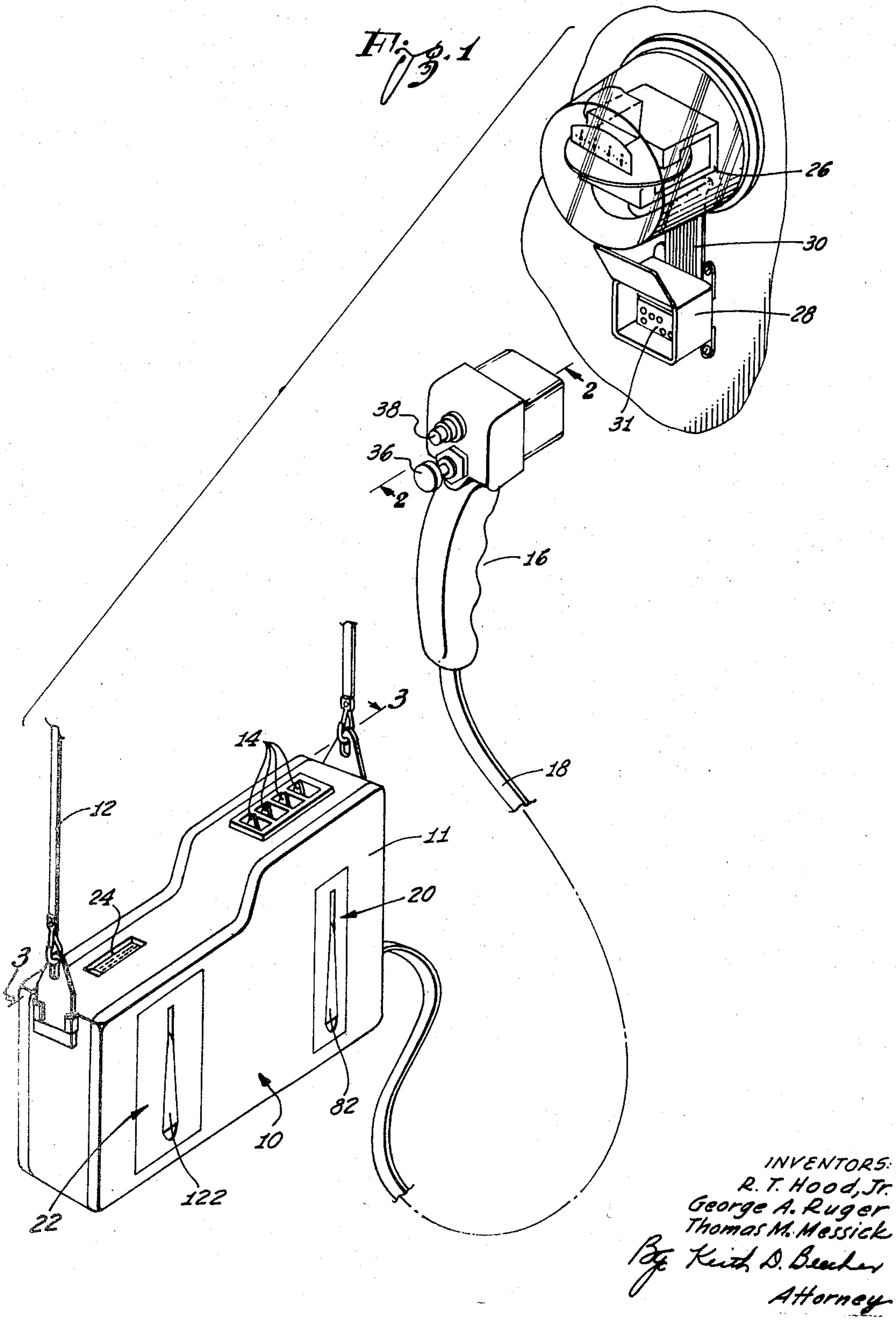
FIGURE 1 is a perspective diagrammatic representation of the recording apparatus of the present invention, and illustrating the manner in which the recording apparatus may be electrically connected to an appropriately modified utility meter.
Figures 2, 8:
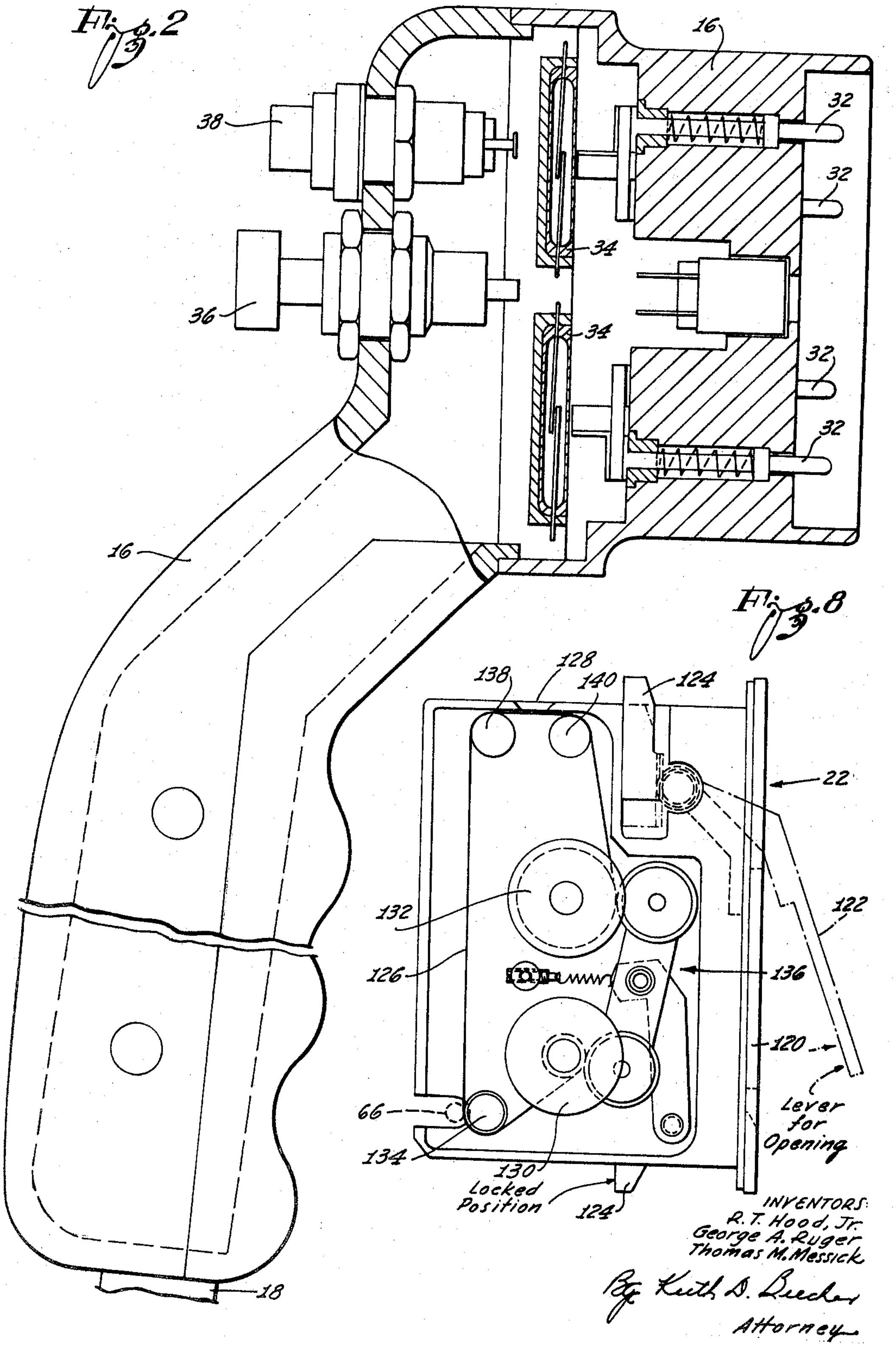
FIGURE 2 is a sectional view of a plug which is used in conjunction with the recording apparatus, the partially sectional view being taken substantially along the line 2—2 of FIGURE 1.
Figure 4:
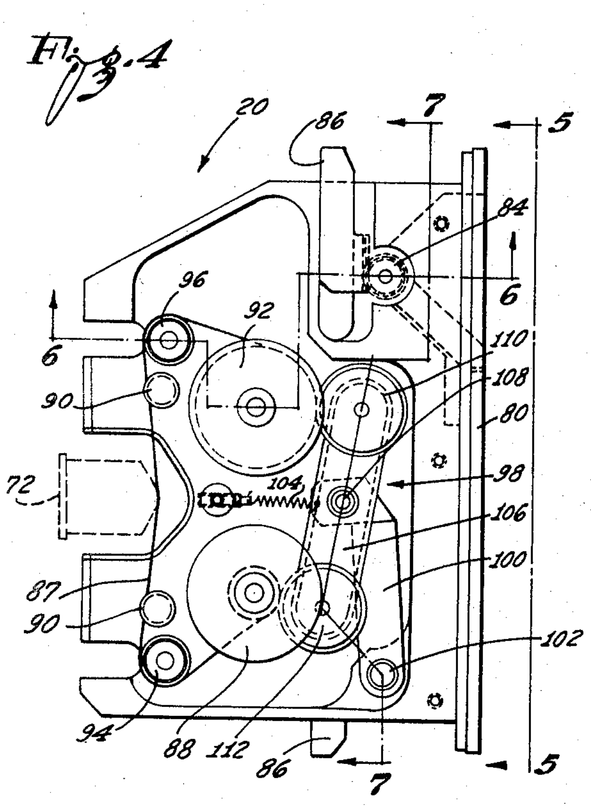
FIGURE 4 is a side view of a magnetic tape cartridge mechanism which may be removably inserted into the recording apparatus of FIGURE 1.
Figure 7:
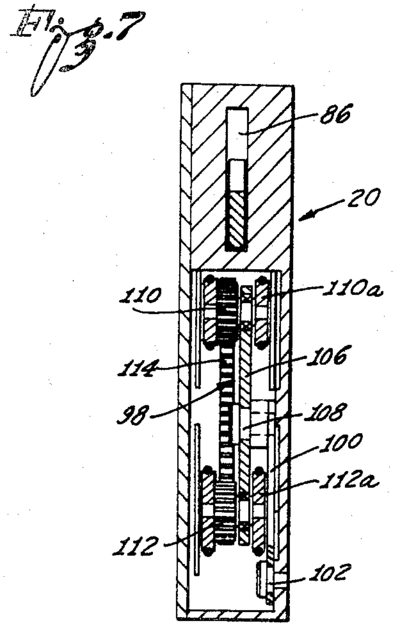
Figure 6:
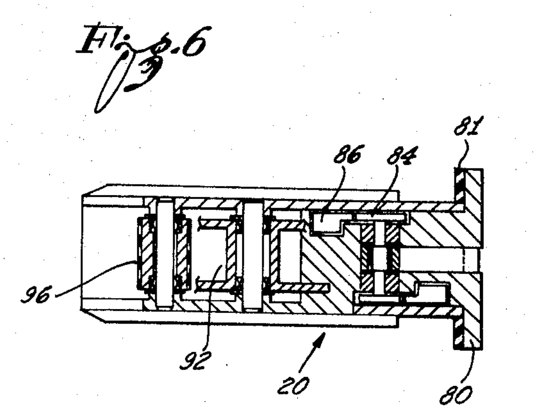
Figure 9:
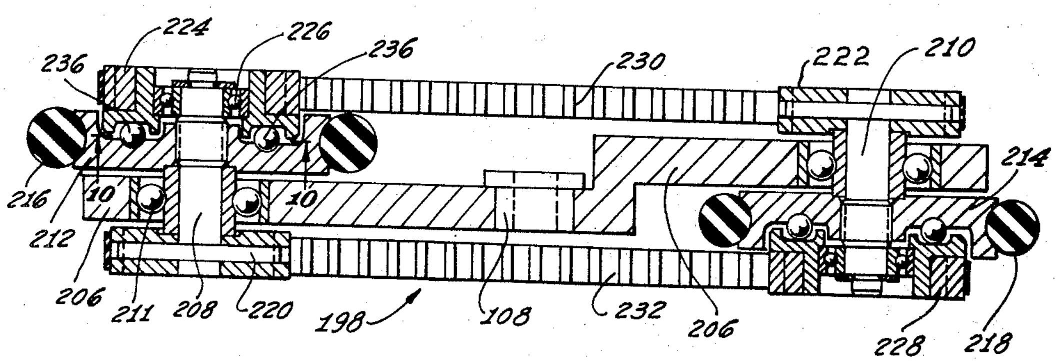
Figure 10:
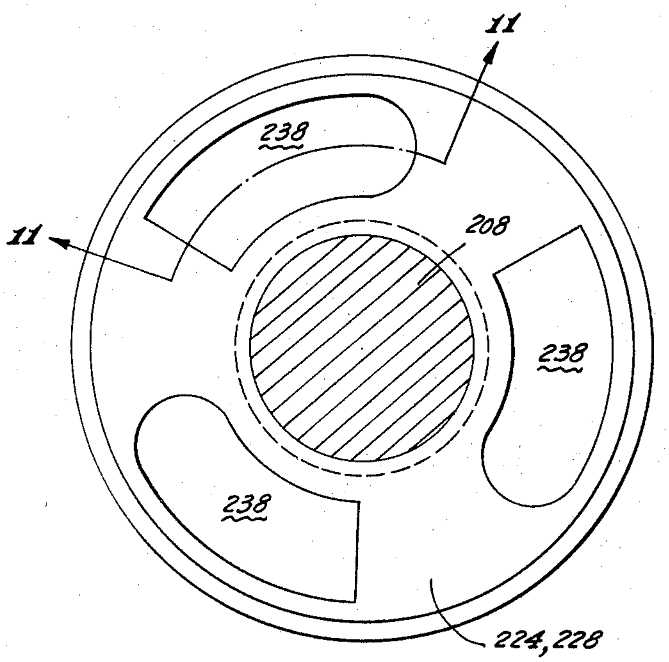

FIGURES 6 and 7 are sectional views of the cartridge of FIGURE 4, taken substantially along the lines 6—6 and 7—7 respectively;

FIGURE 8 is a side elevational view of a paper tape cartridge which, likewise, may be removably inserted into the apparatus of FIGURE 1;

FIGURE 9 is a view, like FIGURE 7, of a modified cartridge embodying the invention;

FIGURE 10 is a view along the line 10—10 of FIGURE 9; and

Figure 11:
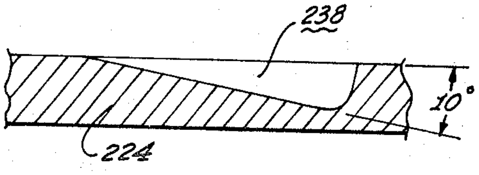

FIGURE 11 is a view along the line 11—11 of FIGURE 10.

The recording apparatus of FIGURE 1 is designated 10. This apparatus is equipped with a carrying strap 12 which may, for example, be slung over the shoulder of the meterman. The apparatus 10 is also provided with a plurality of manually controlled switches 14. These switches, for example, may be set to positions corresponding to the readings of a utility meter.

As mentioned above, the apparatus of the invention may be used to record the readings of a meter directly, when the meter is equipped with suitable digital encoding apparatus. If the meter is not so equipped, the meterman may adjust the switches 14 in accordance with the readings of the meter.

The recording apparatus 10 illustrated in FIGURE 1 is also equipped with a plug 16. The illustrated plug 16 has a pistol-like grip, for convenience. It is electrically connected to the recording apparatus 10 by means of a cable 18.

A cartridge 20 is removably mounted in the casing 11 of the recording apparatus 10, and this cartridge includes the magnetic taps mechanism, as will be described. The cartridge 20 may be inserted into the casing 11, as will be described, and a set of recordings may be obtained. Then, the cartridge may be simply removed at the central station, so that its recorded information may be processed. Then, a new cartridge may be inserted into the casing, so that the magnetic recording apparatus is in condition to receive a new set of recordings.

Likewise, a second cartridge 22 is removably mounted in the casing of the recording apparatus 10, although this feature may be omitted if so desired. This latter cartridge may be similar to the cartridge 20. The cartridge 22 includes a mechanism for driving a paper tape past an observation window 24 in the casing 11 of the apparatus 10. This paper tape, for example, moves in synchronism with movements of the magnetic tape of the cartridge 20. The paper tape has, for example, information recorded on it indicating to the meterman the location at which the next reading is to be taken.

A utility meter, such as a usual watt-hour meter 26, is illustrated in FIGURE 10. Suitable digital encoding apparatus, such as described in the aforementioned copending application Ser. No. 254,126, is installed in the watt-hour meter 26, and the resulting electrical signals, corresponding to the meter readings, are supplied to a receptacle 28 by means of a flexible cable 30.

The receptacle 28 may be similar, for example, to the type disclosed in the copending application Ser. 254,620, filed Jan. 29, 1963, now Patent No. 3,193,635. The copending application describes a receptacle which not only provides electrical connections to the encoding apparatus in the meter 24, but also provides data identifying the particular meter. This latter data, in the receptacle 20, is provided by means of a plurality of depressions in a terminal board 31 in the receptacle, these depressions being coded, so as to provide a pattern of depressions peculiar to the particular meter 26.

The plug 16 is shown on an enlarged scale, and in somewhat greater detail in FIGURE 2. It will be observed that the plug 16 includes a plurality of spring-loaded pins 32. These spring-loaded pins, for example, are magnetically coupled to corresponding reed switches 34.

Whenever the plug 16 is plugged into a receptacle, such as the receptacle 28, different ones of the pins 32 fall into the apertures in the terminal board 31, depending upon the particular coding selected for that particular receptacle. This controls the actuation of the reed switches 34, so that identifying signals for the corresponding meter 26 may be recorded.

In addition, the signals representing the meter reading are also applied to the recording apparatus by way of the plug 16, when it is inserted into the receptacle 28. The receptacle 28 may be provided with a waterproof housing and cover, as shown in FIGURE 1.

The plug 16 is also equipped with a push-button switch 36. This push-button switch, when depressed, establishes an electrical connection to the recording apparatus, so that it will undergo a recording cycle. The meterman plugs the plug 16 into the receptacle 28, and then depresses the push-button switch 36. This causes the magnetic tape in the cartridge 20 in the recording apparatus to be moved through one field (representing the number of frames corresponding to one customer's data), and the corresponding identifying and meter reading signals to be recorded on the tape. During the recording process, an indicator lamp 38 is energized.

In some locations, the receptacle 28 may only carry the identifying information, as provided by the apertures in the panel 31. In that case, the meterman actuates the switches 14, as described above, in correspondence with the readings displayed by the utility meter.

Figure 3:
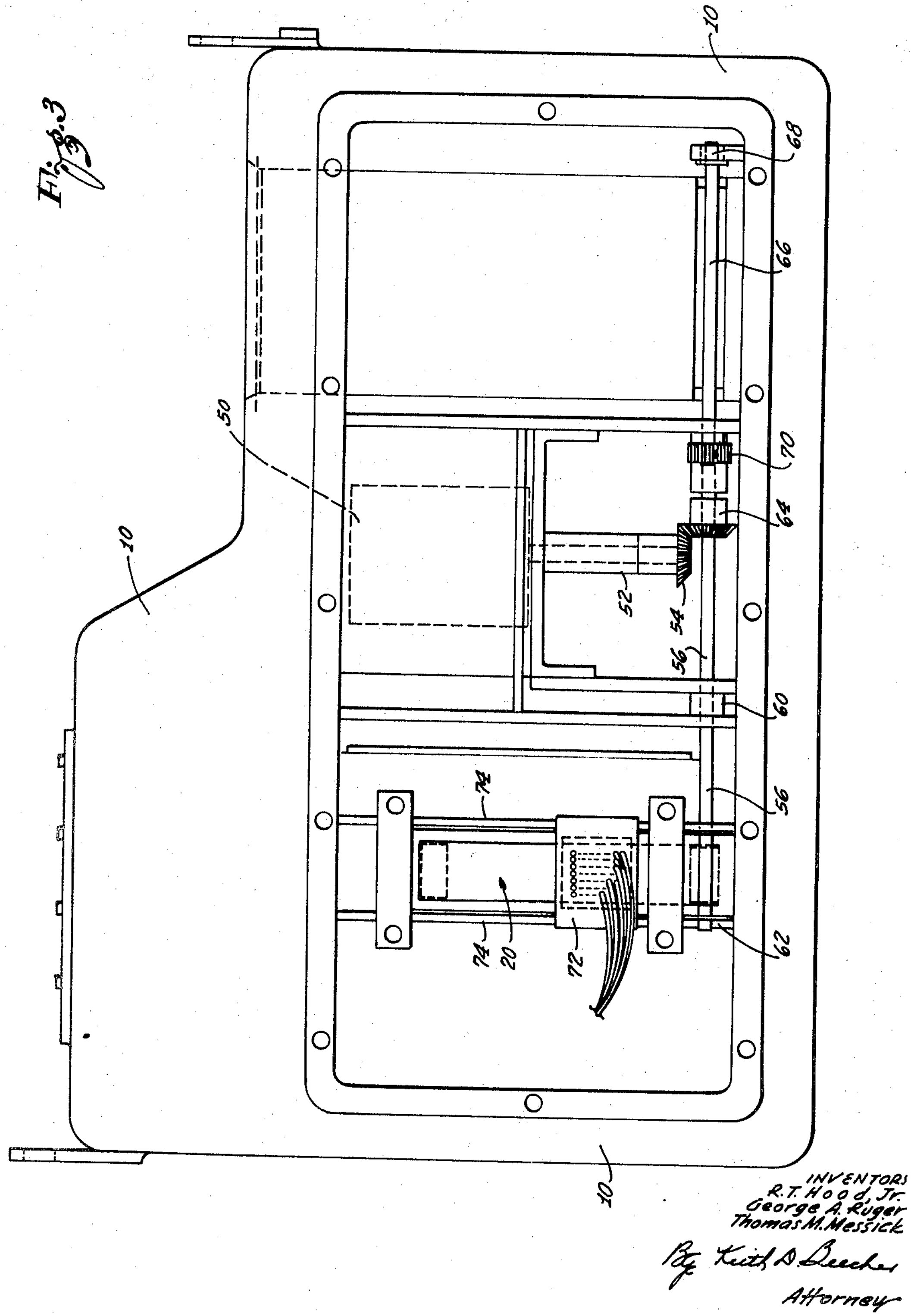
FIGURE 3 is a side elevational view of the recording apparatus, taken along the lines 3—3 of FIGURE 1, and with a side cover removed to reveal the internal components of the apparatus.

As shown in FIGURE 3, the recording apparatus 10 is equipped with an electric motor 50. This motor may be energized by means of an appropriate battery carried in the casing of the recording apparatus 10. The motor 50 has a drive shaft 52, and a miter gear 54 is mounted at the end of the drive shaft.

A further shaft 56 is rotatably mounted in the recording apparatus at right angles to the shaft 52. This latter shaft may be journalled in bearings 60 and 62. A miter gear 64 is mounted on the shaft 56 in meshing relationship with the miter gear 54.

Therefore, rotation of the drive shaft 52 by the motor 50 causes the shaft 56 to rotate. The shaft 56 serves as a capstan drive for the magnetic tape mechanism carried by the cartridge 20, as will be explained.

A further shaft 66 is rotatably mounted in the housing of the recorder 10, this latter shaft being journalled in suitable bearings, such as the bearings 68. The shaft 66 is coupled by means, for example, of a gear 70 to the shaft 56. In this manner, the drive shaft 52 drives both the shafts 56 and 66. As will be described, the shaft 66 serves as a capstan drive for the paper tape carried by the cartridge 22.

The recorder apparatus 10 also includes an electromagnetic record head assembly 72. This head assembly is supported on an appropriate bracket 74, in position so as to be engaged by the magnetic tape in the cartridge 20, when the cartridge is in position in the recording apparatus.

The cartridge 20 is shown in more detail in FIGURES 4–7. As illustrated in FIGURES 4–7, for example, the cartridge 20 includes a base plate 80 which engages the face of the casing 11 of the apparatus 10 when the cartridge is in place. A resilient gasket 81 is interposed between the base plate and the casing 11.

A latching control lever 82 is pivotally mounted on the base plate 80 to be accessible from the exterior when the cartridge is in place, as shown in FIGURE 1. The lever 82 is coupled to a pair of pinions, such as the pinion 84 which, in turn, engages meshing racks on respective latches 86.

Figure 5:
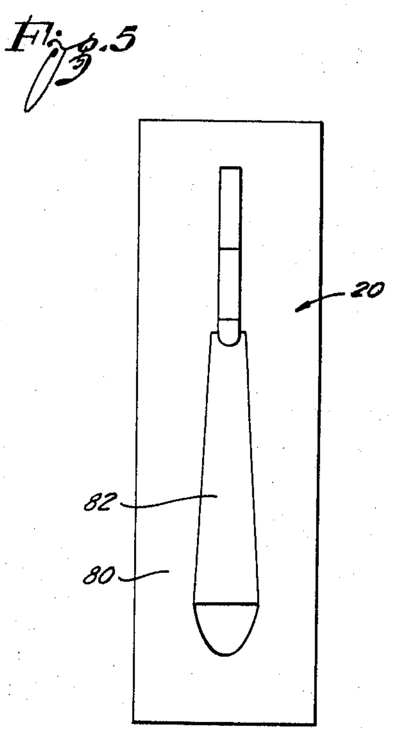
FIGURE 5 is an end view of the apparatus of FIGURE 4, taken along the line 5—5 of FIGURE 4.

When the lever 80 is in the down position, illustrated in FIGURES 1, 4 and 5, the latches 86 extend outwardly from the side of the cartridge 20 to engage corresponding slots in the housing of the recorder apparatus 10. As shown in FIGURE 4, the latches 86 have a wedge-shaped configuration, so that the cartridge is drawn firmly into the housing of the recorder 10, with the base plate 80 bearing against the resilient gasket 81, when the lever 82 is moved down into the plane of the base plate 80.

As best shown in FIGURE 4, for example, the magnetic tape 87 is wound on a pay-off reel 92 which, in turn, is rotatably mounted in the cartridge 20. The tape 87 passes over a pair of idlers 90 and across the face of the magnetic record head 72 to a take-up reel 88. The take-up reel likewise is rotatably mounted in the cartridge 20.

The magnetic tape 8 7also passes over a first spring-loaded rotatable idler 96, and then over a second spring-loaded rotatable idler 94. Each of the idlers may have a rubberized rim. The rotatable idler 94 is located, for example, in position such that it squeezes the magnetic tape against the capstan shaft 56 (FIGURE 3) when the cartridge 20 is in place in the recorder apparatus 10. Then, when the motor 50 is energized to drive the shaft 56, the tape 87 is drawn across the face of the magnetic record head 72 from the pay-off reel 92 to the take-up reel 88.

In order to hold the magnetic tape 87 under tension, as it passes across the face of the head 72, a mechanism 98 is provided. This latter mechanism includes an arm 100 which is pivotally mounted in the cartridge 20 at a pivot mount 102. A spring 104 serves to bias the arm 100 in a counter-clockwise direction about the pivot mount 102. A further arm 106 is pivoted to the free end of the arm 100 on a pivot mount 108. A pair of rotatable timing gears 110 and 112 are mounted on the ends of the arm 106.

The timing gear 110 is coupled to a wheel 110*a* (FIGURE 7), and the timing gear 112 is coupled to a wheel 112*a* (FIGURE 7). An O-ring is mounted on the periphery of each of the wheels 110*a* and 112*a*, and the O-rings are biased into engagement with the tape on the reels 88 and 92 by the spring 104. The timing gears 110 and 112 are intercoupled by a toothed belt 114.

The mechanism 98 provides a convenient coupling between the take-up reel 88 and the pay-off reel 92. As the magnetic tape 87 is drawn from the pay-off reel 92 by the engagement of the capstan shaft 56 with the tape at the surface of the idler 94, the timing gear 110 is caused to rotate, by virtue of the engagement of the O-ring on the wheel 110*a* with the tape on the reel 92.

The above mentioned rotation of the timing gear 110 is transmitted through the belt 114 to the timing gear 112. The O-ring on the wheel 112*a* engages the magnetic tape 87 on the take-up reel 88, and causes the take-up reel 88 to rotate.

The relative diameters of the timing gears 110 and 112 are such that there is a tendency for the take-up reel 88 to be driven faster than the pay-off reel 92. This tendency creates slippage in the mechanism, and it assures that the tape 87 is maintained in a taut condition as it is drawn across the face of the head 72.

In like manner, and as shown in FIGURE 8, the cartridge 22 includes a base member 120 which engages a flange in the housing of the recording apparatus 10, when the cartridge 22 is in place, as shown in FIGURE 1. The cartridge 22 includes a lever arm 122 which, like the lever arm 82 of the cartridge 20, may be moved to an outer position to retract a pair of latches 124, so that the cartridge may be removed. Alternately, the lever arm 22 may be moved into an inner position, in the plane of the base 20, when the cartridge 120 is in place, so as to wedge the cartridge firmly into the housing of the recorder 10.

When the cartridge 22 is in place, a paper tape 126 is drawn by the capstan shaft 66 of FIGURE 3 past an aperture 128, so that the tape may be viewed through the window 24 in the housing of the recording apparatus. The paper tape is initially wound on a pay-off reel 132, and it is drawn onto a take-up reel 130. These reels, of course, are rotatably mounted in the cartridge 22. The mechanism includes a rotatably mounted puck 134, and the paper tape 26 is biased against this puck by the capstan shaft 66, when the cartridge 22 is in place in the recording apparatus. A coupling mechanism 136, similar to the mechanism 98 of the cartridge 20 in FIGURE 4, is included in the cartridge 22.

As shown in FIGURE 8, the paper tape 126 extends around idlers 138 and 140, so that it may be drawn across the opening 128. As mentioned above, appropriate route information may be inscribed on the paper tape 126. The tape 126 moves in synchronism with the magnetic tape 87, so that whenever a particular recording is made, the paper tape moves to display a new set of information at the viewing window 24. This new set of information, for example, may apprise the meterman as to where the next reading is to be made.

The embodiment of the invention shown in FIGURES 9, 10 and 11 comprises a modified form of the mechanism

98 described above. The latter mechanism is designated 198. The mechanism 198 operates, like the mechanism 98, to drive the take-up reel 88 at an increased rate, as the pay-off reel rotates. However, the mechanism 198 is reversible in that it can be operated to drive the take-up reel when the magnetic tape is driven in the reversed direction.

The reversible mechanism 198 is advantageous in that it can be driven in either direction. For example, the reversible mechanism permits the cartridge to be removed from the apparatus, when the recordings have been completed and the tape has been completely wound from the pay-off reel onto the take-up reel, and placed in the processing apparatus at the central station. Then, by a reverse process, the magnetic tape is driven in the opposite direction, and the mechanism 198 causes it to be re-wound.

The mechanism 198 includes an arm 206 which is pivotally mounted in the cartridge 20. The arm 206 replaces the arm 106 of the first embodiment. As before, the arm 206 is mounted on the arm 100, as in FIGURE 4, and is biased by the spring 104.

A pair of shafts 208 and 210 are rotatably mounted on opposite ends of the arm 206 in bearings, such as the bearing 211. A pair of drive wheels 212 and 214 are affixed to the respective shafts 208 and 210. The drive wheels have O-rings 216, 218 mounted in their peripheries.

It will be appreciated that the spring 104 (FIGURE 4) biases the O-ring 216 against the tape in the pay-off reel 92 and the O-ring 218 against the tape in the take-up reel 88. When the tape is driven in a first direction, the wheels 212 and 214 cause the shafts 208 and 210 to rotate in a first direction. Conversely, when the tape is driven in the opposite direction, the shafts 208 and 210 are caused to rotate in the reversed direction.

A timing gear 220 is affixed to one end of the shaft 208, and a timing gear 222 is affixed to the opposite end of the shaft 210. Each of these gears may have a predetermined number of teeth, such as, for example, sixteen. A timing gear 224 is rotatably mounted on the opposite end of the shaft 208 by means of a bearing 226. A similar timing gear 228 is rotatably mounted on the opposite end of the shaft 210. The timing gears 224 and 228 each have a particular number of teeth, for example, seventeen. A toothed timing belt 230 couples the gear 224 to the gear 222. A second toothed timing belt 232 couples the gear 228 to the gear 220. The gear 224 is releasably coupled to the wheel 212 by three balls 236 which are supported in a peripheral groove in the wheel 212 and in individual inclined grooves 238 in the pulley 224 (FIGURES 10 and 11). The wheel 214 is similarly coupled to the gear 228.

When the magnetic tape 87 is driven in a first direction so as to cause it to be reeled past the head 72 from the pay-off reel 92 to the take-up reel 88, the engagement of the O-ring 216 with the tape on the pay-off reel causes the shaft 208 to rotate in a first direction. This direction is such that the balls 236 roll up the inclined grooves 238 and engage the timing gear 224. This causes the timing gear 224 to rotate and drive the timing gear 222 through the timing belt 230.

Due to the teeth ratio of the timing gears 224 and 222, the timing gear 222 is driven at a slightly faster rate. This, as in the previous example, assures that the tape will be held taut, as it is drawn across the head.

During the drive described in the preceding paragraph, the direction of rotation of the shaft 210 is such that the wheel 214 is not coupled to the timing gear 228, so that the gear 228 rotates freely on the shaft 210.

When the tape 87 is driven in the reverse direction, however, the wheel 214 is coupled to the timing gear 228. Then the timing gear 228 drives the timing gear 220 and shaft 208 at an increased speed, as the timing gear 224 rotates freely on the shaft 208. This action, as explained above, creates a tendency for the take-up reel to be driven faster than the pay-off reel. The tape itself, in overcoming the tendency and producing slippage in the mechanism is held in a taut condition as it is drawn across the head.

The above-described coupling is advantageous in that for a particular direction of tape movement the wheel 212 is coupled to the pulley 224 within a fraction of a degree of rotation and the timing gear 228 rotates freely on the shaft 210. Conversely, for a reversed direction of tape movement the converse is true. This action, moreover, is achieved without the need for additional energy-consuming clutch actuating mechanisms.

The invention provides, therefore, an improved tape recorder in which a simple releasable cartridge mechanism is utilized. The improved cartridge mechanism is simple and compact, and it operates efficiently to draw the tape from one reel to another; this being achieved in an improved manner and with a minimum of drive instrumentalities.

It will be appreciated that while certain embodiments of the invention have been shown and described, modifications may be made.

We claim:

1. A magnetic tape recording cartridge comprising a housing having first and second openings for respectively receiving in operative relation with a magnetic recording tape contained in said housing a recording head and a rotating drive member, a guide member mounted in said housing adjacent said second opening, a pair of tape reels mounted in said housing with opposite ends of said tape being wound thereabout, said tape between said reels following a path adjacent said first opening and between said second opening and said guide member, a pair of wheels mounted in said housing respectively adjacent said reels for rotation about axes fixed relative to each other and having their peripheries respectively biased into engagement with the tape windings on said reels, a coupling arranged to transfer without slippage and at a fixed ratio of peripheral speeds the rotative motion of one of said wheels to the other said wheel, and a latch for retaining said cartridge in a recording device with said recording head and said drive member in respective operative registry with said openings.

2. The cartridge of claim 1, wherein said coupling comprises toothed portions rotative with said wheels and a single timing belt positively coupling said portions.

3. The cartridge of claim 1 wherein said ratio is such that the wheel adjacent the take-up reel is driven at the greater peripheral speed.

4. The cartridge of claim 3 wherein said wheels are mounted for bidirectional rotation and said coupling includes first and second portions alternately exclusively operative for opposite rotations of said wheels, said portions each having associated therewith a said ratio, said ratios being inverse to each other.

5. A portable recording apparatus including: a housing; drive means including rotatable capstan means mounted in said housing for drawing an elongated flexible recording medium along a predetermined path; a recording transducer head mounted in said housing in position to be engaged by said recording medium; a cartridge removably mounted in said housing and including a rotatably mounted pay-off reel and a rotatably mounted take-up reel for the recording medium; means for guiding the recording medium along said predetermined path; means for biasing said recording medium against said capstan means; a first rotatable wheel member positioned to engage said recording medium on one of said reels, a second rotatable wheel member positioned to engage said recording medium on the other of said reels, a lever arm pivotally mounted in said cartridge, a support arm for said first and second rotatable wheel members pivotally mounted at an intermediate point thereof on the free end of said lever arm, resilient means biasing said lever arm to urge said first and second rotatable wheel members against said recording medium on respective ones of the aforesaid reels, and means intercoupling said first and second rotatable wheel members to transmit rotatable motion from one of said rotatable wheel members to the other at a fixed ratio of peripheral speed to tension said recording medium in either direction of wheel rotation; said means including first and second pulleys at each wheel member alternately exclusively operative for opposite rotations of said wheels, and belt means coupling the first pulley at one wheel with the second pulley at the other wheel.

6. The apparatus of claim 5 including clutch means coupling said wheel members to said second pulleys.

References Cited

UNITED STATES PATENTS

| | | | |
|---|---|---|---|
| 2,657,871 | 11/1953 | Pettus | 242—55.14 |
| 2,971,715 | 2/1961 | Mitchell | 242—55.130 |
| 3,001,025 | 9/1961 | Gaubert | 242—55.13 X |

FOREIGN PATENTS

| | | |
|---|---|---|
| 610,117 | 10/1960 | Italy. |

GEORGE F. MAUTZ, *Primary Examiner.*